May 27, 1924.

R. S. BASSETT

LIQUID METER 1,495,946

Filed July 10, 1922

INVENTOR

Robert S. Bassett

Patented May 27, 1924.

1,495,946

UNITED STATES PATENT OFFICE.

ROBERT S. BASSETT, OF BUFFALO, NEW YORK.

LIQUID METER.

Application filed July 10, 1922. Serial No. 574,093.

*To all whom it may concern:*

Be it known that I, ROBERT S. BASSETT, a citizen of the United States of America, and a resident of the city of Buffalo, county of Erie, and State of New York, have invented certain new and useful Improvements in Liquid Meters, of which the following is a full, clear, and exact description.

My invention relates to improvements in liquid meters in which the several principal parts of the meter are held in their normal positions relative to each other at all usual pressures by frangible fastenings that will release them when the meter is subject to an extraordinary pressure such as that due to the freezing of the liquid it may contain.

The objects of my present invention are principally to so design the frangible fastenings that certain of the frangible portions will break before certain other of the frangible parts, thus controlling the movements of the principal parts of the meter relative to each other, so that they will be displaced relatively in predetermined directions after failure of the frangible portions.

My invention also provides for frangible parts so designed that they can be manufactured at reduced cost and for other advantages such as those of easy replacement. Both of the constructions shown also have the advantages of having the frangible portions protected by the body of the meter, so that the whole will present a neat appearance and so that any shocks to the meter, such as would be caused by dropping it, would not be borne by the parts containing the frangible portions, as would be the case if such parts protruded to any extent from the assembled meter as has been necessary with any other inventions along similar lines.

I will now proceed to definitely describe the manner in which I have carried out my invention and then claim what I believe to be novel.

In the drawings, Figure 1 is a vertical section of my improved meter on the line A—A, Fig. 2, showing the principal parts of the meter and the fastenings of same in normal position.

Figure 4A:
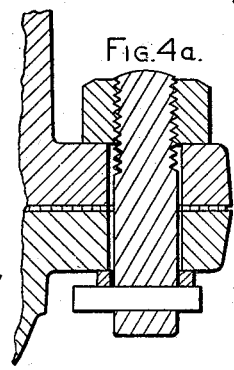
Figure 4B:
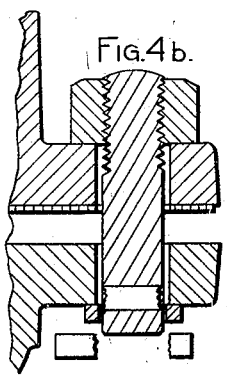

Figure 4$^a$ is a section of one of the frangible fastenings in normal position.

Figure 4$^b$ is a section on the same plane as Figure 4$^a$ but after the frangible fastening has failed, due to the abnormal pressure within the body of the meter.

The outer casing of the meter is composed of two detachable main casing parts 1 and 2, which are held together by bolts such as 20 and 21 passing through holes 3, 3 and 4, 4, in meeting flanges 5 and 6 formed in same, and between which is supported the liquid measuring mechanism, which in this drawing is shown of the well known nutating disc type. The register hood 7 is located on top of outer top main casing 1 and contains a register not shown. The measuring chamber is composed of lower half 8 formed with supporting flange 9, and upper half 10 formed with supporting flange 11. The nutating measuring disc 12 is enclosed and loosely supported between the halves 9 and 10 of the measuring chamber. The intermediate gear plate 13 is mounted on top of measuring chamber half 10. In gear plate 13 is rigidly fastened intermediate gear post 14 on which is loosely supported toothed intermediate gear 15 and pinion 16. Toothed stuffing box gear 17, which in normal position meshes with toothed pinion 16, is rigidly mounted on the lower end of stuffing box shaft 18, which is rotatably mounted in stuffing box 19, located in the upper wall of outer top main casing 1. Meeting flanges 5 and 6 are fastened together while in normal relation by clamping bolts 20 and 21 passing through flange holes 3 and 4 which are larger in diameter than bolts 20 and 21. On the upper end of bolts 20 and 21 are clamping nuts 24. In holes in the lower ends of bolts 20 and 21 are frangible shearing pins 25 and 26, either the size or the material of which they are made, or both, being such that shearing pins 25 in bolts 20 require a greater force before releasing than the pins 26 in bolts 21. Mounted on the bottoms of bolts 20 and 21 and closely fitting same, are supporting washers 27, located between flange 6 and shearing pins 25 and 26.

Having described above a construction of my improved meter, I will now describe its advantages and action.

Figure 1:
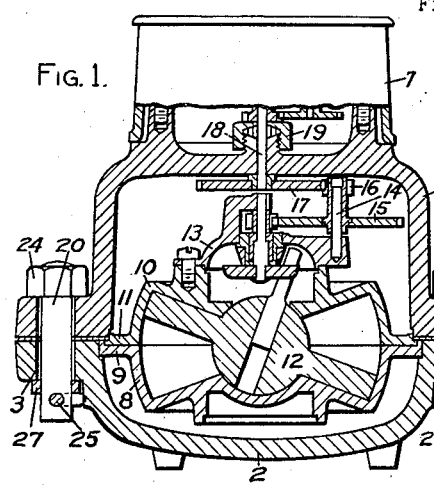
Figure 3:
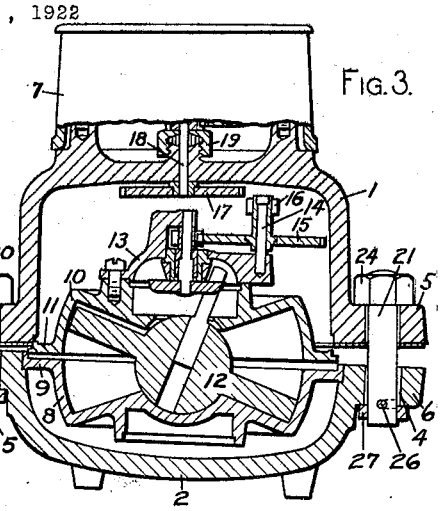
Figure 3 is a vertical section of my improved meter taken on the same plane as Figure 1 but after the meter has been frozen and the principal parts released in a predetermined direction.
Figure 2:
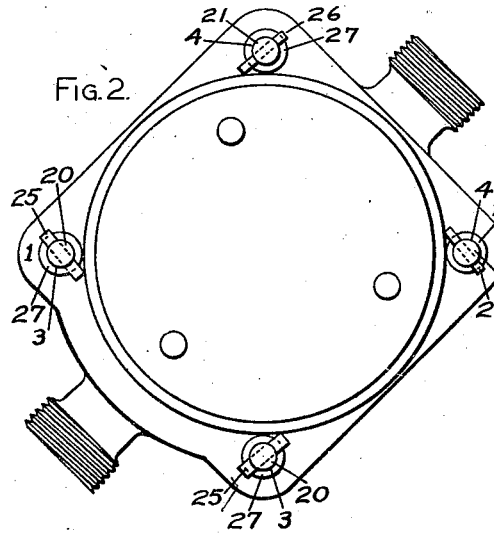
Figure 2 is an upward view of the bottom of my improved meter, showing the fastenings with the frangible parts in normal position.

When the parts of the meter are assembled the meeting flanges 5 and 6 are fastened together by the clamping bolts 20 and 21 placed in holes 3 and 4. When the nuts 24 are screwed down on bolts 20 and 21, the ends of frangible shearing pins 25 and 26 engage the outside wall of meter casing 2 and prevent the bolts from turning, which makes the pins serve a double purpose and cuts down the length of the bolt very much as compared with a bolt fitted with some frangible device, and also with a head of the customary type. This combination use of the pin is novel as applied to liquid meters and is one of the important points in my invention, as it cuts down the cost of the bolts 20 and 21 to a very great extent and it makes a neat and compact fastening. The shearing pins 25 and 26 also bear on supporting washers 27 which in turn bear on the bottom of flange 6; the parts of the meter and the frangible fastenings being as shown in Figure 1. The meter is then put in service and left in operation. In due course of time the liquid in the meter may freeze. As the pipes entering and leaving the meter are smaller than the meter they freeze solid first so that as the larger body of liquid in the meter freezes it cannot escape through the pipes and the pressure in the interior of the meter gradually increases until the outer main casing parts 1 and 2 of the meter are forced apart, being allowed to separate through the shearing of the pins 26, which causes the main casing parts 1 and 2 to separate obliquely, the motion being generally as if hinged around pins 25, which being stronger than pins 26 do not shear entirely through but give slightly as required for the separation of main casing parts 1 and 2. The parts of the meter and the frangible clamping devices take the canted positions shown in Figure 2, and pinion 16 is moved safely away from stuffing box gear 17 without damage to either, which might have occurred should shearing pins 25 have let go before shearing pins 26, as might have been the case if all the shearing pins had been of approximately the same strength. The two halves of the measuring chamber 8 and 10 also separate, releasing the disc 12. All submerged parts of the meter are thus relieved from undue strain or distortion and the meter may be re-assembled by replacing the shearing pins only and be as good as new.

While I have shown my invention as adapted to a disc meter for purposes of illustration, I do not wish to confine it to this style of meter only, as it obviously may be adapted to many other styles of liquid meters with equally good results. Also, while I have shown the frangible fastening in only two forms it may be made otherwise without departing from the spirit of my invention.

Having described my invention what I claim and desire to secure by Letters Patent is:

1. A releasable fastening device comprising two separable parts having holes through them, clamping bolts passing through said holes, a shearing pin mounted in a hole in one bolt and another shearing pin of a lesser strength mounted in a hole in another bolt so the parts when under abnormal pressure will separate in a predetermined canted position in relation to each other; substantially as and for the purpose described.

2. A releasable fastening device comprising two separable parts having holes through them, supporting washers, clamping bolts passing through both said holes and said washers, shearing pins of predetermined different relative degrees of frangibility mounted in holes in said bolts and bearing on said washers, so the parts when under abnormal pressure will separate in a predetermined canted position in relation to each other; substantially as and for the purpose described.

3. A liquid meter comprising two separable parts of the meter casing having holes through them, clamping bolts passing through said holes; a shearing pin mounted in a hole in one bolt and another shearing pin of a lesser strength mounted in a hole in another bolt, so the parts of the meter when under abnormal pressure will separate in a predetermined canted position in relation to each other; substantially as and for the purpose described.

4. A liquid meter comprising two separable parts of the meter casing having holes through them, supporting washers, clamping bolts passing through both said holes and said washers, shearing pins of predetermined different degrees of frangibility mounted in holes in said bolts and bearing on said washers, so that the parts of the meter when under abnormal pressure will separate in a predetermined canted position in relation to each other; substantially as and for the purpose described.

ROBT. S. BASSETT.

Witnesses:
EARL R. RYDER,
GEO. B. BASSETT.